United States Patent
Ellbogen et al.

(10) Patent No.: US 10,264,037 B2
(45) Date of Patent: Apr. 16, 2019

(54) CLASSROOM MESSAGING

(71) Applicant: Microsoft Technology Licensing, LLC, Redmond, WA (US)

(72) Inventors: Danielle Ellbogen, Seattle, WA (US); Divya Kumar, Sammamish, WA (US); Rowan Forster, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/224,577

(22) Filed: Jul. 31, 2016

(65) Prior Publication Data
US 2018/0034869 A1 Feb. 1, 2018

(51) Int. Cl.
*G06F 3/0484* (2013.01)
*H04L 29/06* (2006.01)
*G09B 5/14* (2006.01)

(52) U.S. Cl.
CPC ...... *H04L 65/4038* (2013.01); *G06F 3/04847* (2013.01); *G09B 5/14* (2013.01); *H04L 65/1093* (2013.01)

(58) Field of Classification Search
CPC ............. H04L 65/1093; H04L 65/4038; G06F 3/04847; G09B 5/14
See application file for complete search history.

(56) References Cited

U.S. PATENT DOCUMENTS

| | | | |
|---|---|---|---|
| 7,234,059 B1 | 6/2007 | Beaver et al. | |
| 8,467,714 B2 | 6/2013 | Ziv-El et al. | |
| 8,799,400 B2 | 8/2014 | Watte | |
| 8,849,931 B2 | 9/2014 | Linner et al. | |
| 9,111,459 B2 | 8/2015 | Robbins et al. | |
| 2002/0087704 A1* | 7/2002 | Chesnais | H04L 29/06 709/228 |

(Continued)

FOREIGN PATENT DOCUMENTS

| | | |
|---|---|---|
| WO | 2008058365 A1 | 5/2008 |
| WO | 2013051020 A9 | 4/2013 |

OTHER PUBLICATIONS

Mendiratta, Hemant, "How to Search in All WhatsApp Chats at Once", Available at: «http://www.techuntold.com/how-to-search-in-all-whatsapp-chats-at-once/», Jun. 24, 2015, 10 pages.

(Continued)

*Primary Examiner* — William L Bashore
*Assistant Examiner* — Gregory A Distefano
(74) *Attorney, Agent, or Firm* — Arent Fox LLP

(57) ABSTRACT

In one example, a presentation control device may allow a presenter, such as a teacher, to control interactions between audience members and the presenter. The presentation control device may display a presentation controlled by a presenter to a presentation audience as part of a group presentation session. The presentation control device may receive from the presenter a communication rule controlling an interaction between an audience member device and the presentation control device as part of controlling the presentation. The presentation control device may receive a communication regarding the presentation from an audience member in the presentation audience via the audience member device. The presentation control device direct the communication based on the communication rule.

21 Claims, 14 Drawing Sheets

(56) References Cited

U.S. PATENT DOCUMENTS

| | | | |
|---|---|---|---|
| 2002/0116462 A1 | 8/2002 | DiGiano et al. | |
| 2003/0034999 A1* | 2/2003 | Coughlin, III | G09B 7/00 715/738 |
| 2003/0211856 A1* | 11/2003 | Zilliacus | G06Q 10/10 455/466 |
| 2004/0143630 A1* | 7/2004 | Kaufmann | G06F 17/30017 709/205 |
| 2004/0255232 A1* | 12/2004 | Hammond | G06F 17/30873 715/207 |
| 2006/0147891 A1* | 7/2006 | Dreyfous | G09B 5/00 434/362 |
| 2006/0195353 A1* | 8/2006 | Goldberg | G06Q 10/06311 705/7.14 |
| 2009/0016504 A1 | 1/2009 | Mantell et al. | |
| 2009/0137257 A1 | 5/2009 | Barber | |
| 2010/0037151 A1* | 2/2010 | Ackerman | G06Q 10/10 715/753 |
| 2012/0157853 A1* | 6/2012 | Gelly | A61B 8/4444 600/459 |
| 2012/0202185 A1 | 8/2012 | Jabara et al. | |
| 2013/0016176 A1* | 1/2013 | Hines | H04N 7/14 348/14.08 |
| 2013/0204942 A1* | 8/2013 | Agarwal | H04L 65/403 709/204 |
| 2014/0372650 A1* | 12/2014 | Caskey | H04L 51/00 710/261 |
| 2015/0341290 A1* | 11/2015 | Cherifi | H04L 51/043 709/206 |
| 2017/0039867 A1* | 2/2017 | Fieldman | G09B 5/065 |

OTHER PUBLICATIONS

"Remind", Available at: <<https://www.remind.com/features>>, Sep. 5, 2015, 8 pages.

"Group Text-Messaging Tools", Available at: <<http://teachinghistory.org/digital-classroom/tech-for-teachers/25761<<, Jan. 19, 2013, 5 pages.

* cited by examiner

| MEMBER ID 510 | MESSAGE COUNT 520 | MESSAGE REVIEW 530 | MESSAGE BLOCK 540 | NETWORK BLOCK 550 |

CLASSROOM MESSAGING

BACKGROUND

A presenter, such as a teacher, may make a presentation to a presentation audience, such as a classroom, using a presentation application. The audience may be local to the presenter or at a remote location from the presenter. The presentation application may present the presentation data as text, imagery, audio, video, or other media. The presentation application may organize the presentation into a series of digital slides, referred to as a slide deck.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to allowing a presenter, such as a teacher, to control interactions between audience members and the presenter. A presentation control device may display a presentation controlled by a presenter to a presentation audience as part of a group presentation session. The presentation control device may receive from the presenter a communication rule controlling an interaction between an audience member device and the presentation control device as part of controlling the presentation. The presentation control device may receive a communication regarding the presentation from an audience member in the presentation audience via the audience member device. The presentation control device direct the communication based on the communication rule.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 5 illustrates, in a block diagram, one example of a communication rule.

DETAILED DESCRIPTION

Figure 1:
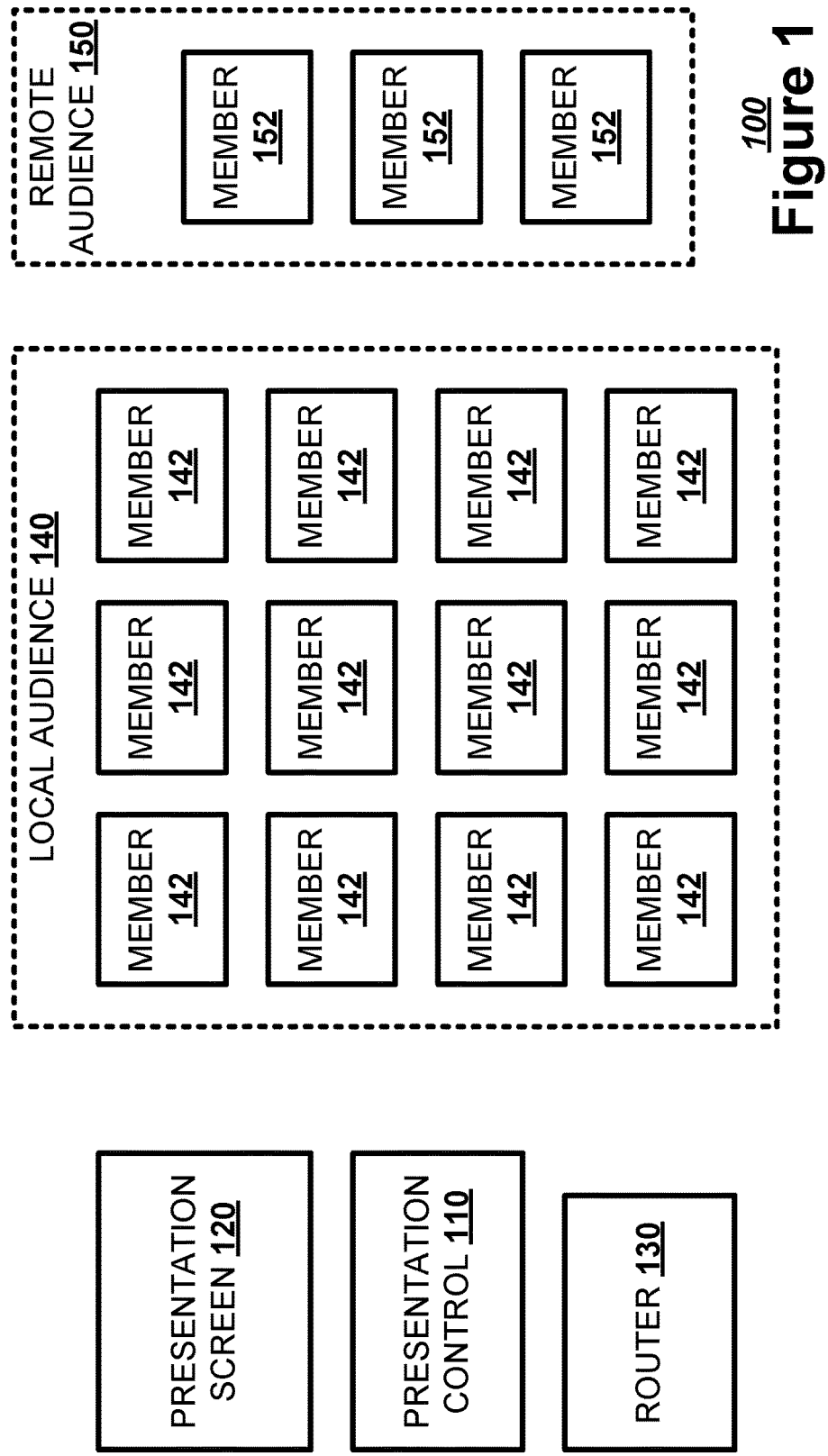
FIG. 1 illustrates, in a block diagram, one example of an interactive presentation environment.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a presentation control device, a computing device, or a machine-implemented method.

In one example, a presentation control device may allow a presenter, such as a teacher, to control interactions between audience members, such as students and the presenter through establishment of communication rules for audience member devices used by the audience members. The presentation control device may display a presentation controlled by a presenter to a presentation audience as part of a group presentation session. The presentation control device may receive from the presenter a communication rule controlling an interaction between an audience member device and the presentation control device as part of controlling the presentation. The presentation control device may receive a communication regarding the presentation from an audience member in the presentation audience via the audience member device. The presentation control device direct the communication based on the communication rule.

Using video conferencing software, a presenter, such as a teacher, may establish a group presentation session in an interactive presentation environment. The interactive presentation environment may maintain channels of communication between the presentation audience and the presenter, so that an audience member may ask relevant questions or provide relevant comments in real time during the presentation. These questions and comments may enrich the learning experience for both the source of the communications and other members of the presentation audience as well. The presenter may use a presentation control application running on a computing device to act as a presentation control device to control the flow of these communications from the presentation audience so as to not disrupt the presentation. The presentation control application may be integrated with a smart assistant module, such as a Siri® or Cortana®, to allow access of multiple application modules on the computing device. Further, the smart assistant module may allow for easy access to network services for research purposes during the presentation.

Additionally, the presenter may use the presentation control device to provide varying degrees of anonymity to the audience members on a member-by-member basis to encourage questions while discouraging distractions. Particularly in a classroom situation, a teacher may judge which students are shy and would benefit from withholding the name of the student from his or her peers or even from the teacher. Further, the teacher may identify a student that would abuse sending communications to disrupt the class and block those students from using that feature.

The presentation control device may have a user interface that facilitates the presenter quickly replying to an audience member through a one tap button. Upon selection of an auto-response button, the presentation control device may automatically send a message to that audience member on behalf of the presenter, such as "After class" or "Wait for the Q&A". The presentation control device may direct the communication to a smart assistant module to formulate a communication response. Alternately, the presenter may use a microphone on the presentation control device to record a communication response to a specific communication. The presentation control device may send the communication to the presentation audience, so that the presenter may respond without manually entering in text.

The user interface may display the communications to the audience members, even if the presenter chooses not to reply. Other audience members may send an up-vote for a communication that the other audience members have an interest in being answered. The presentation control device may display a tally of the up-votes to the presenter or to the presentation audience.

The audience member may include a presentation context with the communication. An audience member device may use a time relative to the start of the presentation to determine the presentation context. In real time, if the presentation organizes the presentation data into a set of slides, the communication may have a slide number or an attached slide. The communication may attach a website uniform resource locator (URL) referenced in the presentation. The communication may attach a screenshot of the audience member device. The audience member may select a data item, such as a text, a digital image, or a media item, in the presentation for inclusion in the communication. The presentation control device may insert the communication into the section of the presentation near the presentation context, or inline into the presentation. The presentation control device may store a communication session, representing a series of communications between the presentation control device and the audience member device, for later review by the presenter or the audience member. The stored communication session may be sent, via email or other methods, to the presenter or the presentation audience. The presentation control device or the audience member device may have a search text function to seek out specific communications.

The user interface for the presentation control device may provide a "Do Not Disturb" button to receive an input from the presenter. Upon selection, the presentation control device may enter a "Do Not Disturb" mode placing a communication session on hold to bring a degree of focus to a specific section of a presentation. During this time, any communications from the presentation audience may be preserved in a communication queue. The presenter may then review the communications in the communication queue upon exiting "Do Not Disturb" mode.

The presenter and the presentation audience may be organized into an interactive presentation environment to facilitate communication. FIG. 1 illustrates, in a block diagram, one example of an interactive presentation environment 100. In an interactive presentation environment 100, a presenter may use a presentation control device 110 to control a presentation shown on a presentation screen 120 via a router 130. The presentation control device 110 may be a dedicated device or a computing device executing a presentation control application. The router 130 may establish a local area network (LAN) inside a presentation room.

A local audience 140 in the presentation room may view the presentation on the presentation screen 120. Each audience member of the local audience 140 may have access to an audience member device 142, either individually or in small groups. The audience member device 142 may be a dedicated device or a computing device executing a presentation audience application. The audience member device 142 may present a version of the presentation to the audience member device 142. The audience member device 142 may present a simplified version of the presentation. Alternately, the audience member device 142 may present supplementary information. The audience member may use the audience member device 142 to connect with the presenter via the presentation control device 110 to send questions or comments regarding the presentation. The presenter may then use the presentation control device 110 to respond to those questions or comments via the audience member device 142 or by projecting the questions or comments on the presentation screen 120. The audience member may use the audience member device 142 to access the internet via the router 130 to investigate material related to the presentation. The presentation control device 110 may control access to the internet by the audience member device 142.

A remote audience 150 outside the presentation room may view the presentation via a remote audience member device 152. Each audience member of the remote audience 150 may have access to the remote audience member device 152, either individually or in small groups. The remote audience member device 152 may be a dedicated device or a computing device executing a presentation audience application. The remote audience member device 152 may present a simplified version of the presentation or may include supplementary information. The audience member may use the remote audience member device 152 to connect with the presenter via the presentation control device 110 to send questions or comments regarding the presentation. The presenter may then use the presentation control device 110 to respond to those questions or comments via the remote audience member device 152. The audience member may use the remote audience member device 152 to access the internet to investigate material related to the presentation. The presentation control device 110 may control access to the internet by the remote audience member device 152.

Figure 2:
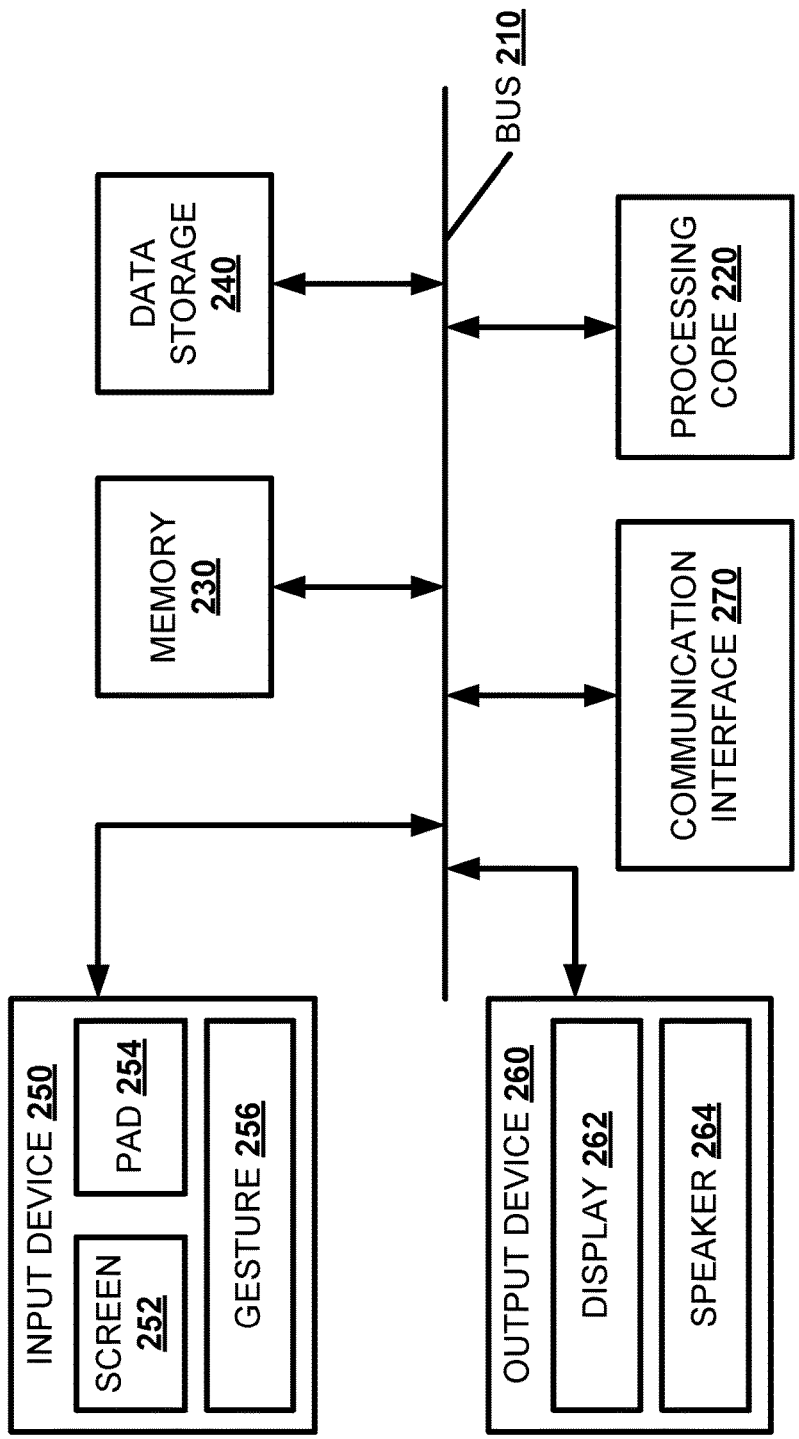
FIG. 2 illustrates, in a block diagram, one example of a computing device usable in an interactive presentation environment.

FIG. 2 illustrates a block diagram of an exemplary computing device 200 which may act as a presentation control device or an audience member device. The computing device 200 may combine one or more of hardware, software, firmware, and system-on-a-chip technology to implement a presentation control device or an audience member device. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to direct the communication based on the communication rule. The processing core 220 may be further configured to block a disruptive audience member from sending communications upon direction of the presenter.

The processing core 220 may be additionally configured to insert the communication into the presentation. The processing core 220 may be also configured to determine an anonymization for the communication based on the communication rule. The processing core 220 may be further configured to anonymize the communication prior to presentation to the presenter. The processing core 220 may be additionally configured to anonymize the communication before broadcast to the presentation audience. The processing core 220 may be also configured to apply an anonymization for the communication on a member-by-member basis.

The memory 230 may be a random access memory (RAM) or another type of dynamic data storage that stores information and a series of instructions for execution by the processing core 220 to implement a group presentation application. The memory 230 may also store temporary variables or other intermediate information used during execution of instructions by the processing core 220. The memory 230 may be configured to maintain a communication queue for communications from the presentation audience when the group presentation session is in a "Do Not Disturb" mode. The memory 230 may be further configured to record the group presentation session for a later review. The memory 230 may be additionally configured to associate presentation context with the communication. The memory 230 may be also configured to record a communication session with the audience member device for a later review. The memory 230 may be further configured to organize a communication session based on the audience member to facilitate searches across communication sessions.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing presentations.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The input device 250 may be configured to receive from the presenter a communication rule controlling an interaction between an audience member device and the presentation control device as part of controlling the presentation. The input device 250 may be configured to receive from the presenter a network rule controlling access to an external network, such as the internet, by an audience member device. The input device 250 may be further configured to receive a "Do Not Disturb" input from the presenter placing the group presentation session in a "Do Not Disturb" mode. The input device 250 may be additionally configured to receive a communication response, such as an audio communication response, to the communication from the presenter.

The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. The output device 260 may be configured to display a presentation controlled by a presenter to a presentation audience as part of a group presentation session. The output device 260 may be further configured to identify to the presenter the audience member sending the communication.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to receive a communication regarding the presentation from an audience member in the presentation audience via the audience member device. The communication interface 270 may be further configured to provide to the presenter control of access to an external network by the audience member device. The communication interface 270 may be additionally configured to establish a communication session with the audience member device. The communication interface 270 may be also configured to return an automated response from a preset list or generated by a smart assistant module to the audience member device. The communication interface 270 may be further configured to broadcast the communication to the presentation audience. The communication interface 270 may be additionally configured to receive from an associate audience member device an up-vote for a query from the audience member.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
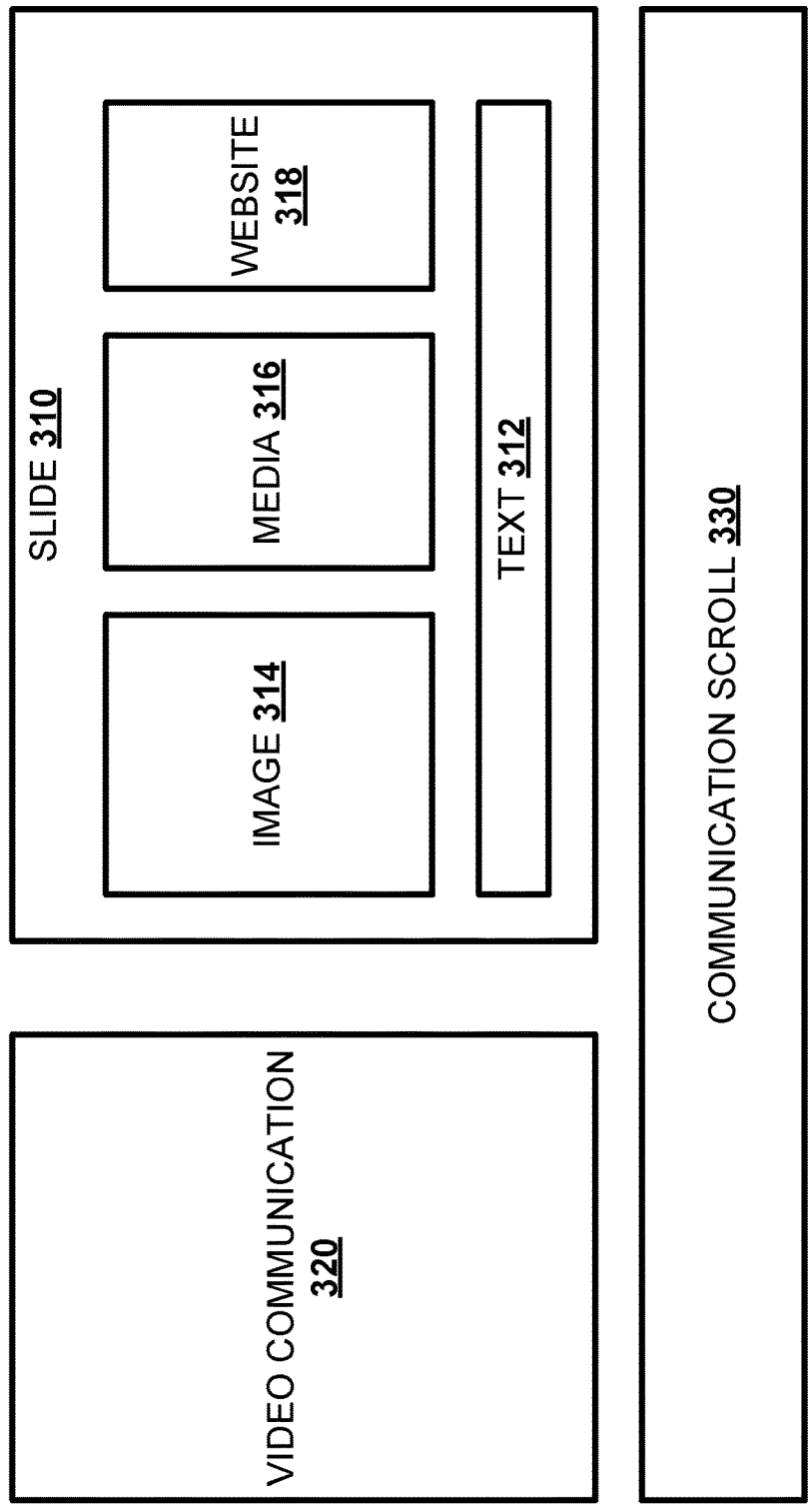
FIG. 3 illustrates, in a block diagram, one example of presentation screen experience.

FIG. 3 illustrates, in a block diagram, one example of presentation screen experience 300. A presentation control device may display a presentation on a presentation screen. A presenter may organize the presentation as a series of slide 310. Each slide 310 may represent a discrete block of information. The slide 310 may present the information as a set of data items, such as a text set 312, an image set 314, a media set 316 having video or audio data, or a website 318 accessing data on the Internet. The presentation screen experience 300 may have a video communication panel 320 allowing a presenter or guest lecturer to guide a presentation audience through the presentation remotely. The presentation screen experience 300 may have a communication scroll 330 displaying a set of one or more communications from an audience member or a presenter. A communication may be a short text or visual message sent between the presenter and the presentation audience discussing the presentation. Alternately, the presentation screen experience 300 may inline a communication in a slide 310 referenced by the communication. The presentation screen experience 300 may place the communication close to a specific data item cited by the communication.

Figure 4:
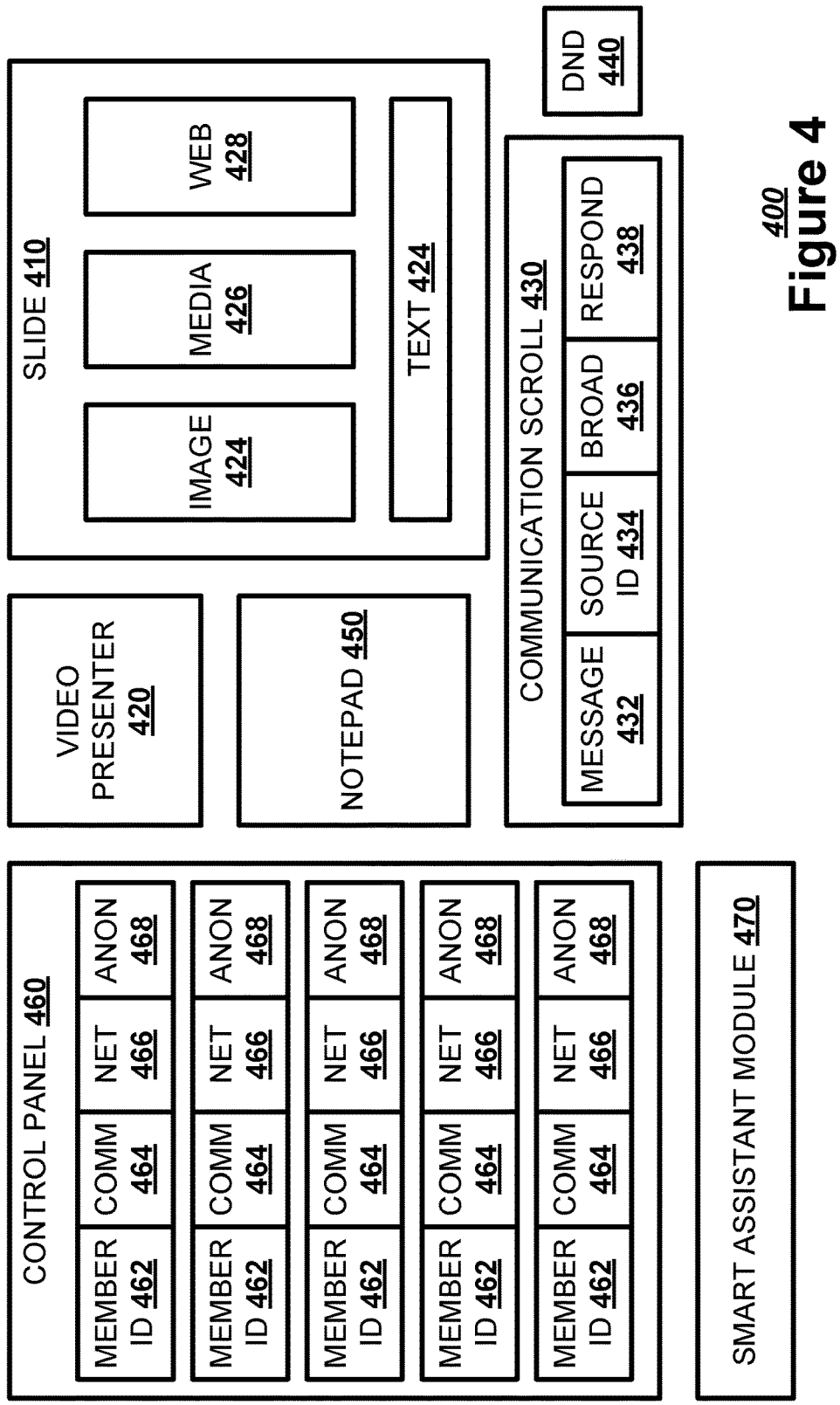
FIG. 4 illustrates, in a block diagram, one example of a presenter user interface.

The presentation control device may show a separate user interface to the presenter. FIG. 4 illustrates, in a block diagram, one example of a presenter user interface 400. The presenter user interface 400 may include some or all of the content shown on the presentation screen experience. For example, the presenter user interface 400 may show a slide 410 presenting a set of data items, such as a text set 312, an image set 314, a media set 316, or a website 428. Additionally, the presenter user interface 400 may have a video communication panel 420 allowing a guest lecturer to assist in guiding a presentation.

The presenter user interface 400 may have a communication scroll 430 displaying a set of one or more communications from an audience member or a presenter. The communication scroll 430 may present a message 432 from an audience member. The message 432 may be associated with a source identifier 434 indicating the audience member device that sent the communication. The message 432 may be associated with a broadcast button 436 that forwards the communication to the presentation audience. The message 432 may be associated with a respond button 438 that generates a response to be sent back to the audience member sending the communication. The response may be an automated response or may generate a form for the presenter to create a response. The communication scroll 430 may have an associated "Do Not Disturb" (DND) button that places the presentation into a "Do Not Disturb" mode. In "Do Not Disturb" mode, communications from the presentation audience may be stored in a queue for later review.

The presenter user interface 400 may have a notepad 450 for presenting and receiving notations by the presenter discussing the presentation. Further, the presenter user interface 400 may have a control panel 460 allowing the presenter to customize the presentation experience of each individual audience member. The control panel 460 may display a member identifier 462 identifying an audience member. The member identifier 462 may be associated with a communication field 464 for entering a communication rule controlling an interaction with an audience member device of an audience member as part of controlling the presentation. The member identifier 462 may be associated with a network field 466 for entering a network rule directing access of an external network by the audience member device. The member identifier 462 may be associated with an anonymity field 468 for selecting an anonymity level for a communication received from the audience member device.

The presenter user interface 400 may have a smart assistant module button 470 for activating a smart assistant module. The presenter may use the smart assistant module to craft automatic responses to the communications. Further the smart assistant module may be used to access a student record to assist in crafting of the communication rules. For example, the smart assistant module may track the comparative rate of response of a student based on the level of anonymity provided for that student to identify students that may benefit from greater anonymity. Additionally, the smart assistant module may flag an audience member that sends a number of communications per time period over a certain amount to be blocked as a disruptive audience member.

For each audience member, the presentation control device may maintain a communication rule. FIG. 5 illustrates, in a block diagram, one example of a communication rule 500. The communication rule 500 may have a member identifier 510 indicating the audience member to which the communication rule 500 applies. The communication rule 500 may have a message count 520 counting the number of messages sent by the audience member. The presentation control device may use the message count 520 to flag disruptive audience members, and to determine which audience members benefit from varying levels of anonymity. The communication rule 500 may have a message review field 530 describing whether a communication from the audience member is to be reviewed by the presenter before being broadcast to the presentation audience. The communication rule 500 may have a message block field 540 indicating whether an audience member is capable of sending a communication to the presenter. The communication rule 500 may have a network block field 550 indicating whether an audience member device is capable of accessing an external network.

Figure 6:
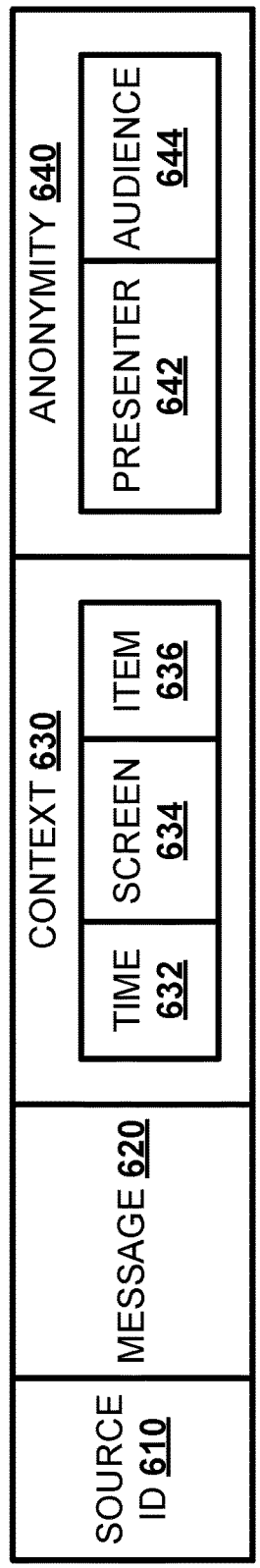
FIG. 6 illustrates, in a block diagram, one example of a communication.

FIG. 6 illustrates, in a block diagram, one example of a communication 600. The communication 600 may have a source identifier 610 indicating the audience member that sent the communication 600. The communication 600 may have a message 620 containing the comment or question sent by the audience member device.

The communication 600 may have a presentation context field 630 indicating the presentation context of the message 620 within the presentation. The presentation context field 630 may describe a presentation timeframe identifier 632, a screenshot 634 of the presentation, and an embedded presentation item 636. The presentation timeframe identifier 632 may be a timestamp relative to the start time of the presentation or a slide identifier for a slide show presentation. The screenshot 634 may be a screenshot taken by the audience member of the presentation displayed on the audience member device. The embedded presentation item 636 may be a presentation item, such as text or an image, copied from the presentation.

The communication 600 may have an anonymity flag field 640. The anonymity flag field 640 may have a presenter anonymity flag 642 indicating that the audience member does not want the presenter to know the identity of the audience member. The presentation control device may then remove the source identifier before displaying the communication to the presenter. The anonymity flag field 640 may have an audience anonymity flag 644 indicating that the audience member does not want the presentation audience to know the identity of the audience member.

Figure 7:
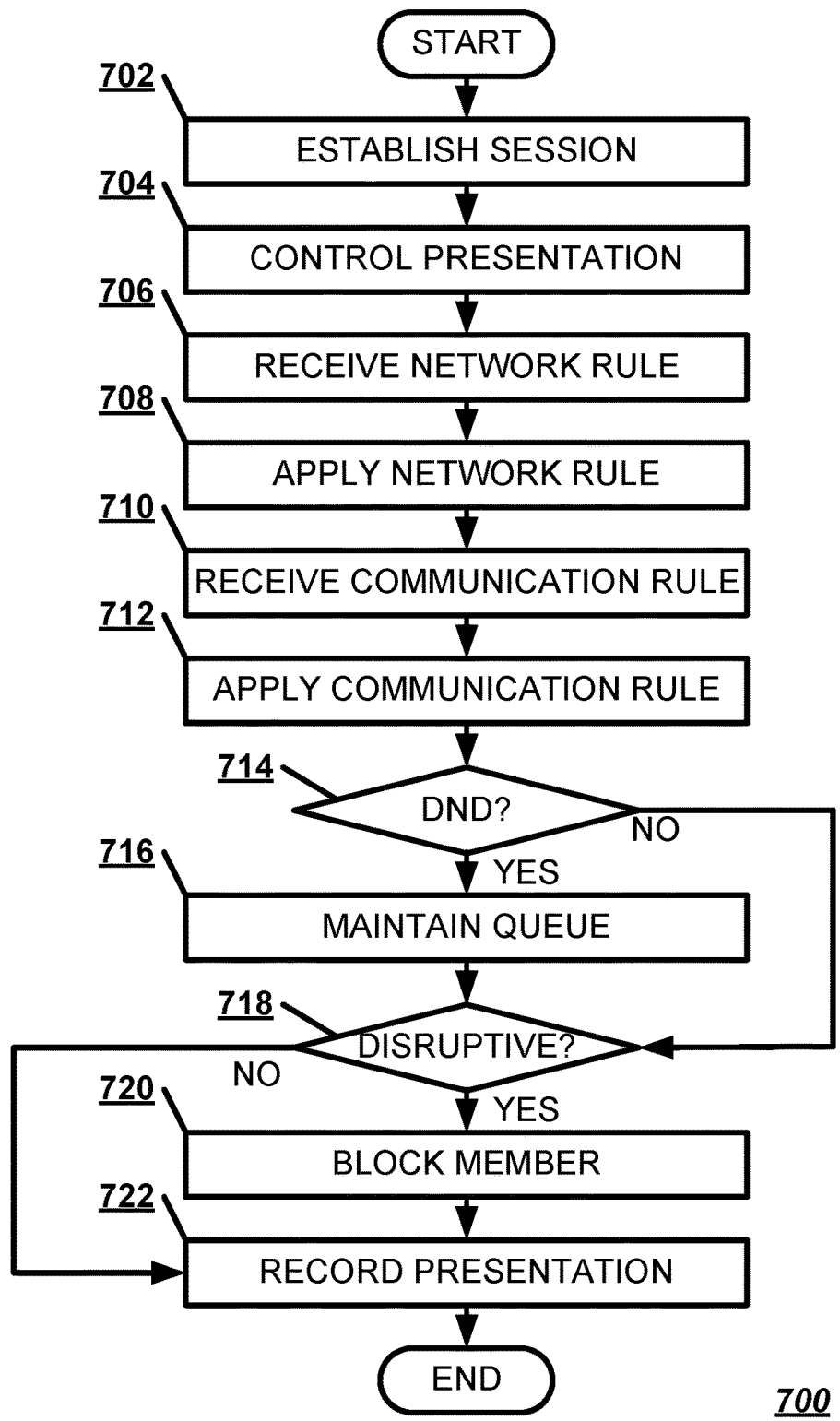
FIG. 7 illustrates, in a flowchart, one example of a method of establishing a presentation session with a presentation control device.

FIG. 7 illustrates, in a flowchart, one example of a method 700 of establishing a presentation session with a presentation control device. The presentation control device may establish a group presentation session for an interactive presentation environment (Block 702). The presentation control device may control a presentation displayed on a presentation screen to a presentation audience (Block 704). The presentation control device may receive from the presenter a network rule directing access of an external network by an audience member device (Block 706). The presentation control device may apply the network rule to the audience member device directing access of an external network (Block 708). The presentation control device may receive from the presenter a communication rule controlling an interaction between an audience member device and the presentation control device as part of controlling the presentation (Block 710). The presentation control device may apply the communication rule to a communication session with the audience member device as part of controlling the presentation (Block 712).

If the presentation control device receives a "Do Not Disturb" input from the presenter placing the group presentation session in a "Do Not Disturb" mode (Block 714), the presentation control device may maintain a communication queue for communications from the presentation audience when the group presentation session is in a "Do Not Disturb" mode (Block 716). If the presentation control device receives a block input from the presenter indicating that the presenter has determined that an audience member is disruptive (Block 718), the presentation control device may block a disruptive audience member device of a disruptive audience member from sending communications upon direction of the presenter (Block 720). The presentation control device may record a group presentation session for a later review (Block 722).

Figure 8:
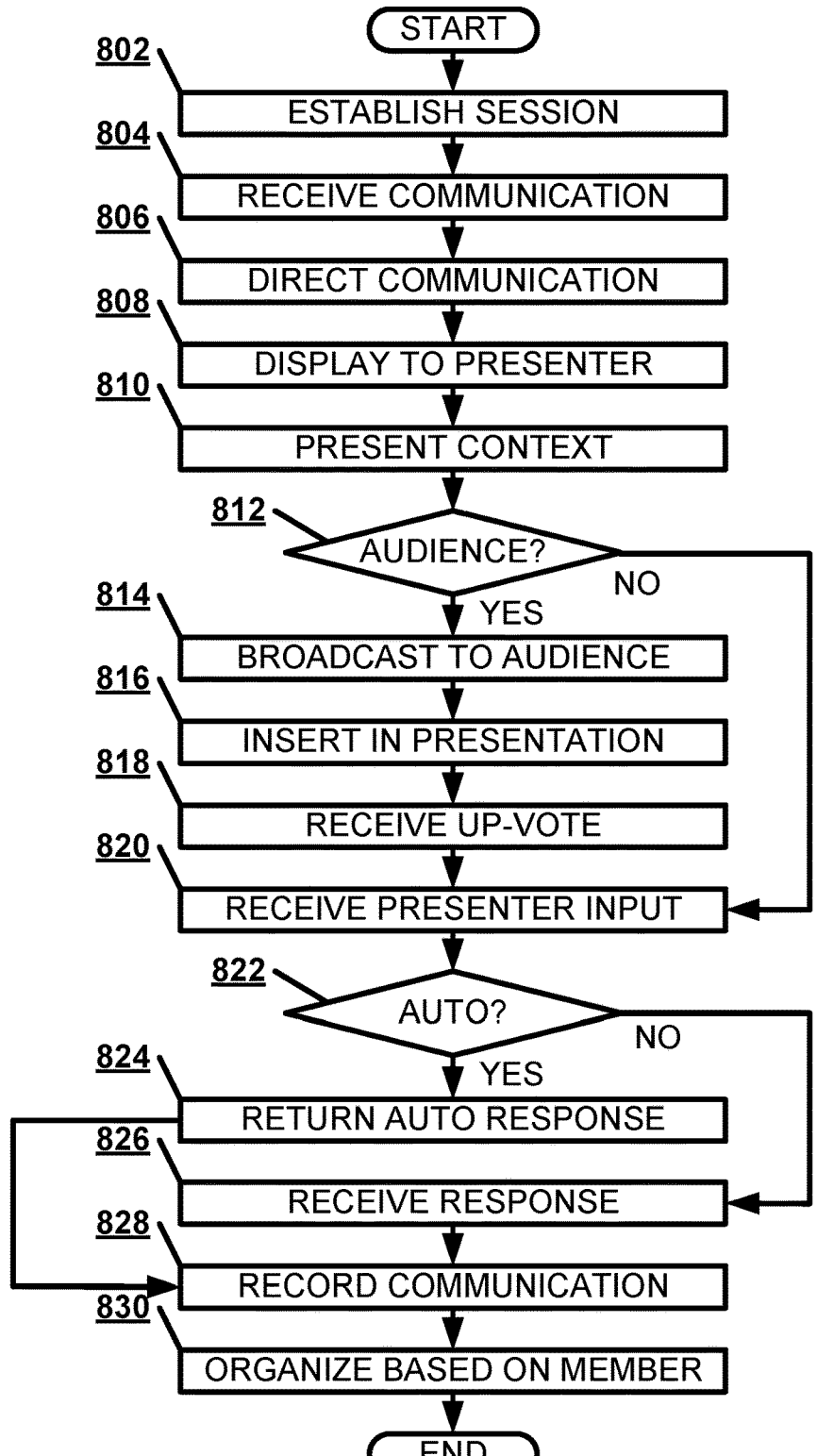
FIG. 8 illustrates, in a flowchart, one example of a method of establishing a communication session with a presentation control device.

FIG. 8 illustrates, in a flowchart, one example of a method 800 of establishing a communication session with a presentation control device. The presentation control device may establish a communication session with an audience member device of an audience member (Block 802). The presentation control device may receive a communication regarding the presentation from an audience member in the presentation audience via the audience member device (Block 804). The presentation control device may direct the communication based on a communication rule controlling interactions with the audience member device (Block 806). The presentation control device may display the communication to the presenter according to the communication rule (Block 808). The presentation control device may present a presentation context for the communication to the presenter (Block 810).

If the communication is directed to the audience (Block 812), the presentation control device may broadcast the communication to the presentation audience (Block 214). The presentation control device may insert the communication into the presentation, such as in the communication scroll or inline in the relevant slide or text block (Block 816). The presentation control device may receive from an associate audience member device an up-vote for the communication (Block 818).

The presentation control device may receive a presenter input indicating a response to the communication (Block 820). If the presenter input indicates an auto-response is desired (Block 822), the presentation control device may return an automated response to the audience member device from a preset list or generated by a smart assistant module (Block 824). Otherwise, the presentation control device may receive a communication response, such as an audio communication response, to the communication from the presenter (Block 826). The presentation control device may record a communication session with the audience member device for a later review (Block 828). The presentation control device may organize a communication session based on the audience member so that the audience member may search across communication sessions (Block 830).

Figure 9:
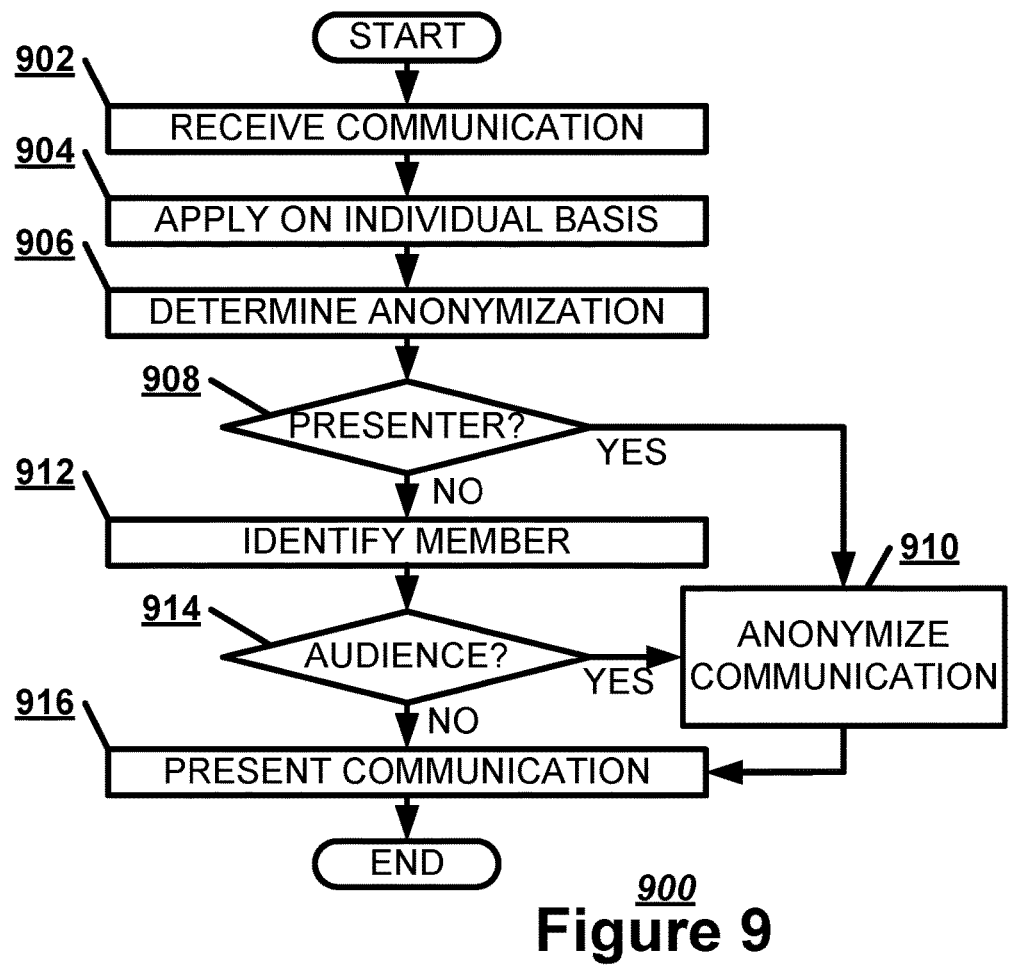
FIG. 9 illustrates, in a flowchart, one example of a method of setting an anonymity level with a presentation control device.

FIG. 9 illustrates, in a flowchart, one example of a method 900 of setting an anonymity level with a presentation control device. The presentation control device may receive a communication from the audience member device regarding the presentation (Block 902). The presentation control device may apply an anonymization for the communication on an individual member-by-member basis (Block 904). The presentation control device may determine an anonymization for the communication based on a communication rule or a directive from the audience member (Block 906). If the audience member has requested anonymity from the presenter and the communication rule permits (Block 908), the presentation control device may anonymize the communication prior to presentation to the presenter (Block 910). Otherwise, the presentation control device may identify to the presenter the audience member sending the communication (Block 912). If the audience member has requested anonymity from the presentation audience, the communication rule permits, and the presenter approves (Block 914), the presentation control device may anonymize the communication before broadcast to the presentation audience (Block 910). The presentation control device may present the communication to the presentation audience, either in a communication scroll or inline in a presentation slide or text block (Block 916).

Figure 10:
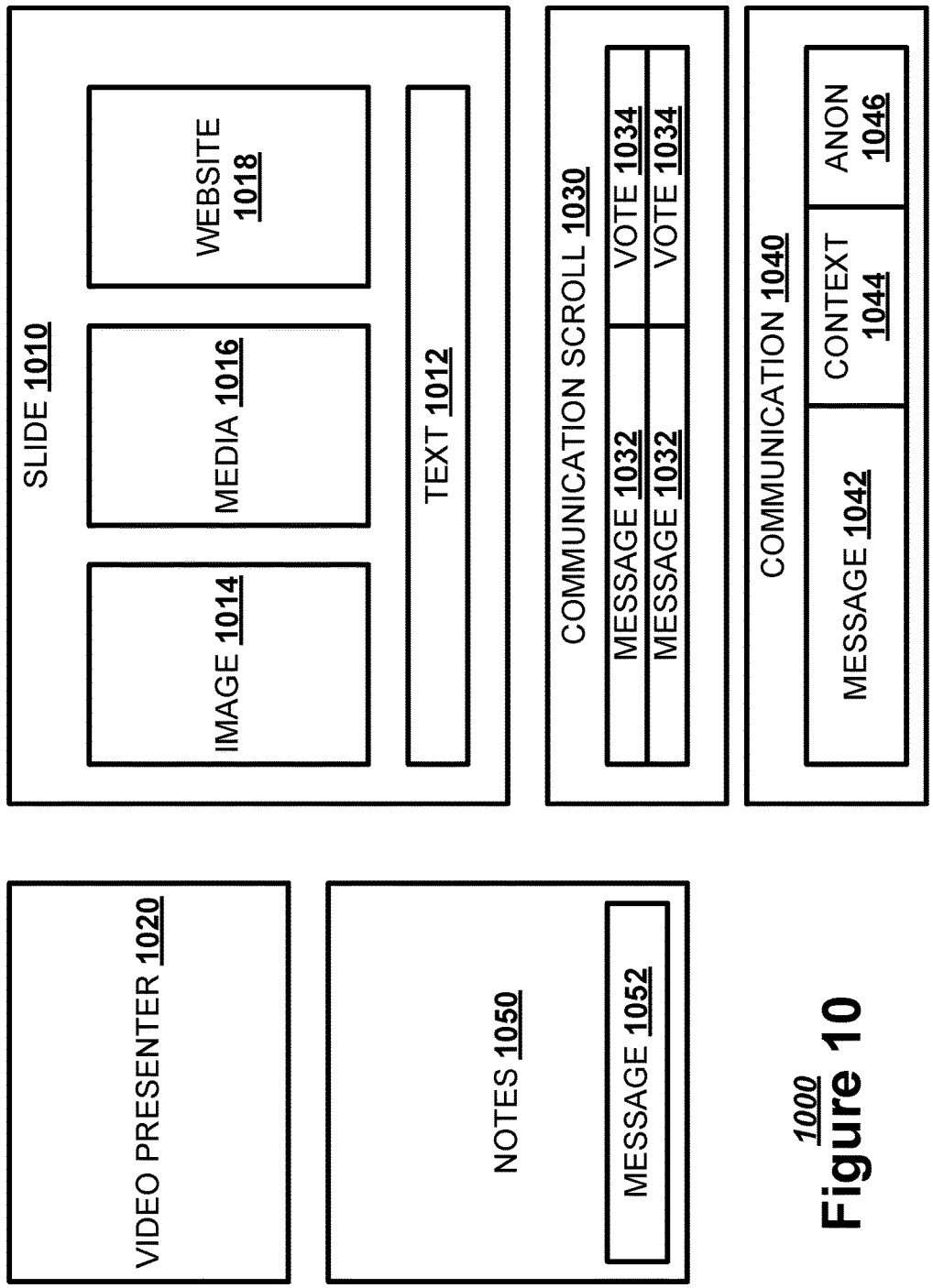
FIG. 10 illustrates, in a block diagram, one example of an audience user interface.

The audience member device may show a separate user interface to an audience member. FIG. 10 illustrates, in a block diagram, one example of an audience user interface 1000. The audience user interface 1000 may include some or all of the content shown on the presentation screen experience. For example, the audience user interface 1000 may show a slide 1010 presenting a set of data items, such as a text set 1012, an image set 1014, a media set 1016, or a website 1018. Additionally, the audience user interface 1000 may have a video communication panel 1020 allowing a presenter or guest lecturer to guide a presentation audience through the presentation remotely.

The audience user interface 1000 may have a communication scroll 1030 displaying a set of one or more communications from an audience member or a presenter. The communication scroll 1030 may present a message 1032 from an associate audience member. The message 1032 may be associated with a vote button 1034 allowing an audience member to indicate interest in having the message explored further.

The audience user interface 1000 may have a communication input 1040 to send comments or queries from the audience member. The communication input 1040 may have a message input form 1042 for the user to enter the text of the message. The communication input 1040 may have a context button 1044 for the audience member to signal that the audience user interface 1000 may capture the current presentation context of the presentation. The context button 1044 may cause the audience user interface 1000 to capture a timestamp relative to the presentation start time or a slide identifier to act as a presentation timeframe identifier. The context button 1044 may cause the audience user interface 1000 to capture a screenshot for the presentation to the communication. The context button 1044 may allow an audience member to select a presentation data item to embed in the communication. The communication input 1040 may have an anonymization level selector 1046 for the audience member to select a degree of anonymity for the communication. The audience user interface 1000 may have a notepad 1050 for receiving notations from the audience member discussing the presentation. The notepad 1050 may have a message button 1052 to cause the most recent notation to be used to populate the message input form 1042.

Figure 11:
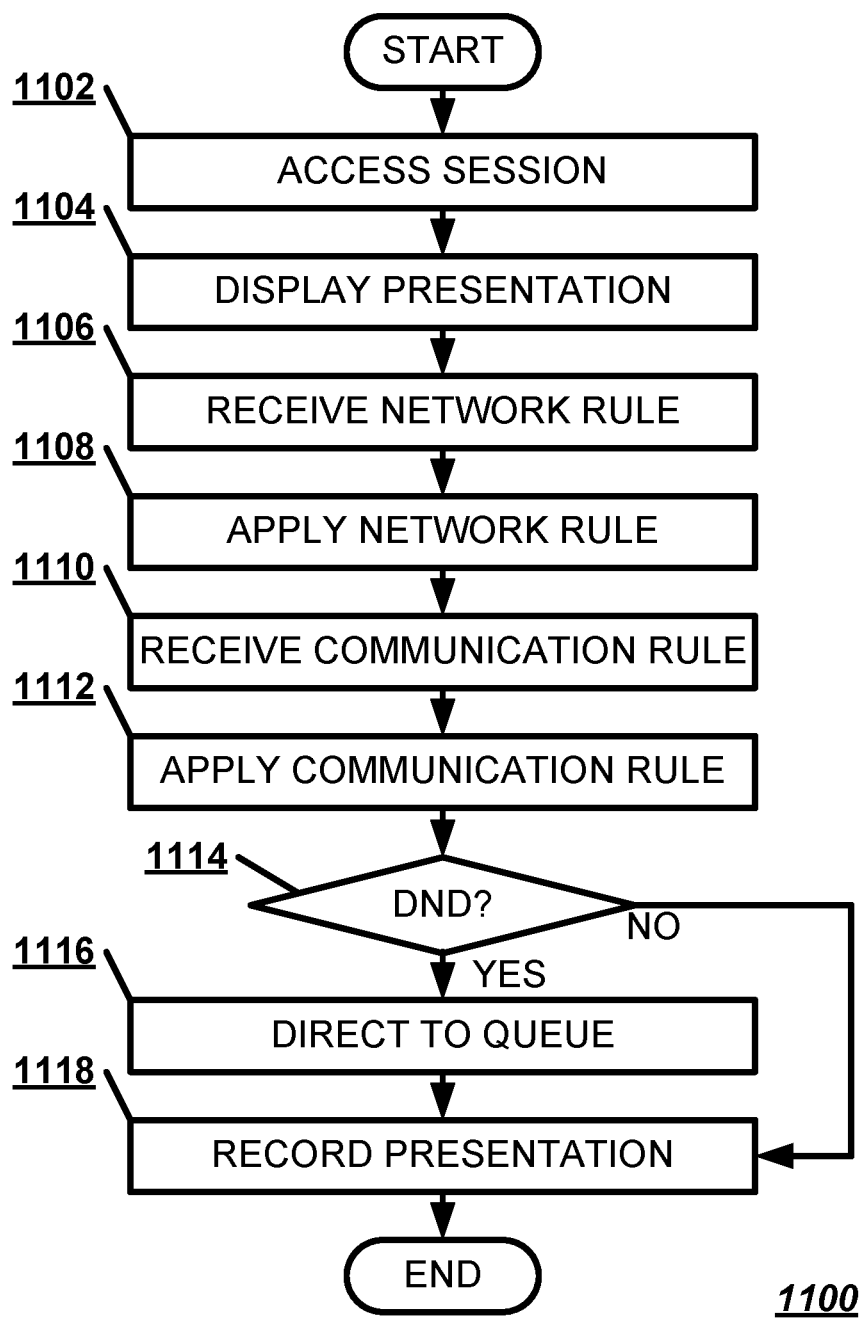
FIG. 11 illustrates, in a flowchart, one example of a method of accessing a presentation session with an audience member.

FIG. 11 illustrates, in a flowchart, one example of a method 1100 of accessing a presentation session with an audience member device. The audience member device may access a group presentation session in an interactive presentation environment (Block 1102). The audience member device may display a presentation controlled by a presentation control device to an audience member of a presentation audience (Block 1104). The audience member device may receive from the presentation control device a network rule controlling access to an external network by the audience member device (Block 1106). The audience member device may apply the network rule describing access to the external network (Block 1108). The audience member device may receive from the presentation control device a communication rule controlling an interaction between the audience member device and the presentation control device as part of controlling the presentation (Block 1110). The audience member device may apply the communication rule to a communication session under control of the presentation control device (Block 1112). If the audience member device receives a "Do Not Disturb" alert from the presentation control device indicating the group presentation session is in a "Do Not Disturb" mode (Block 1114), the audience member device may direct the communication to a communication queue when the group presentation session is in a "Do Not Disturb" mode (Block 1116). The audience member device may record the group presentation session for a later review (Block 1118).

Figure 12:
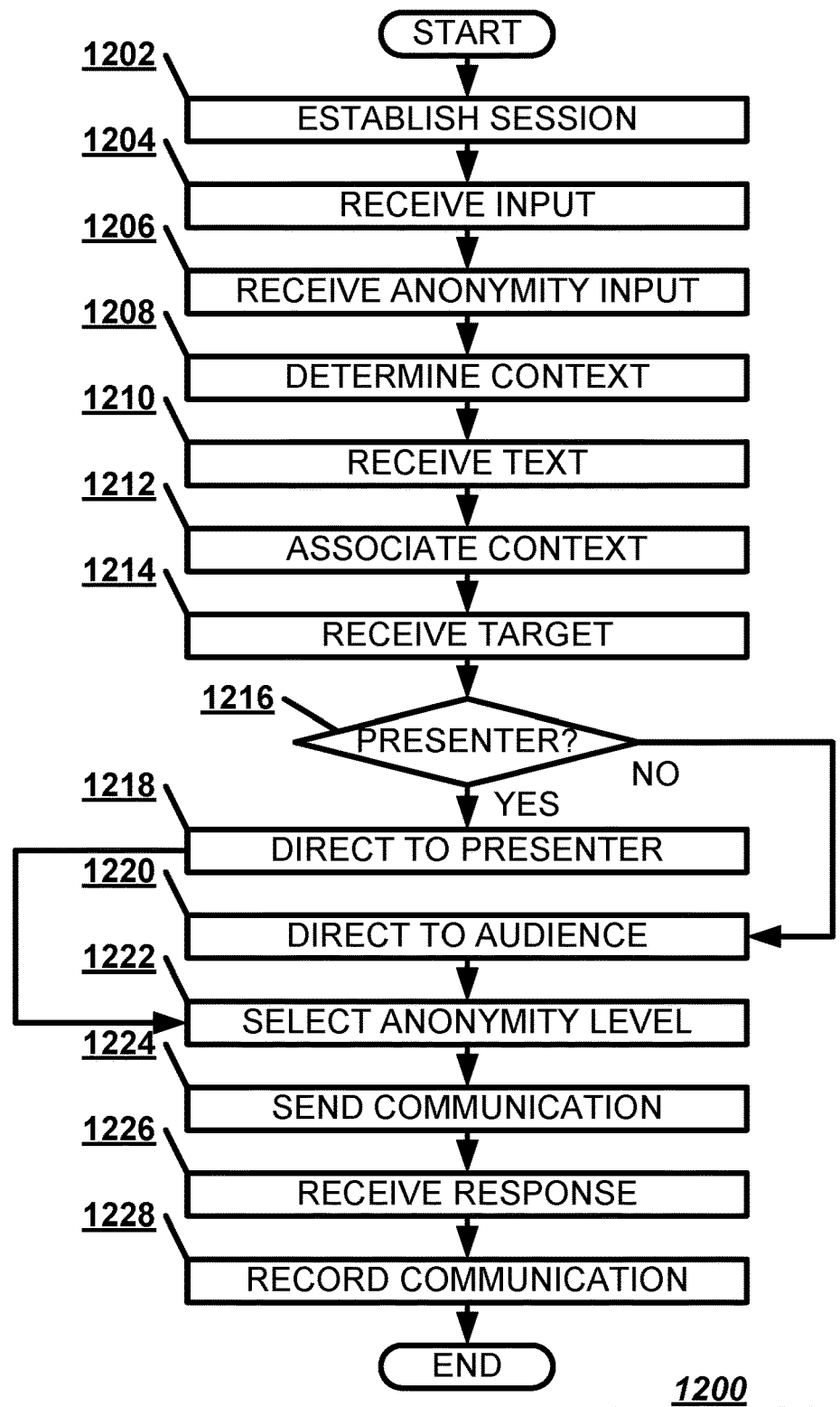
FIG. 12 illustrates, in a flowchart, one example of a method of initiating a communication session with an audience member.

FIG. 12 illustrates, in a flowchart, one example of a method 1200 of initiating a communication session with an audience member device. The audience member device may establish a communication session between a presentation control device and the audience member device (Block 1202). The audience member device may receive an input from the audience member indicating the audience member wants to send a communication to the presenter (Block 1204). The audience member device may receive an anonymity input from the audience member indicating whether the audience member desires the communication source to be public, anonymous to the presentation audience, or anonymous to the presenter (Block 1206). The audience member device may determine a presentation context relative to the presentation for the communication (Block 1208). The audience member device may receive a message regarding the presentation from an audience member in the presentation audience to be sent to the presenter (Block 1210). The audience member device may associate a presentation context with the communication (Block 1212).

The audience member device may receive a communication target from the audience member (Block 1214). If the communication target is the presenter (Block 1216), the audience member device may direct the communication to the presenter (Block 1218). If the communication target is the presentation audience (Block 1216), the audience member device may direct the communication to be broadcast to the presentation audience (Block 1220). The audience member device may select an anonymity level for the communication based on the anonymity input from the audience member (Block 1222). The audience member device may send the communication regarding the presentation to the presentation control device subject to a communication rule entered by a presenter controlling an interaction between the audience member device and the presentation control device (Block 1224). The audience member device may receive a communication response, such as an audio communication response, to the communication from the presentation control device (Block 1226). The audience member device may record a communication session between the presentation control device and the audience member device for a later review (Block 1228).

Figure 13:
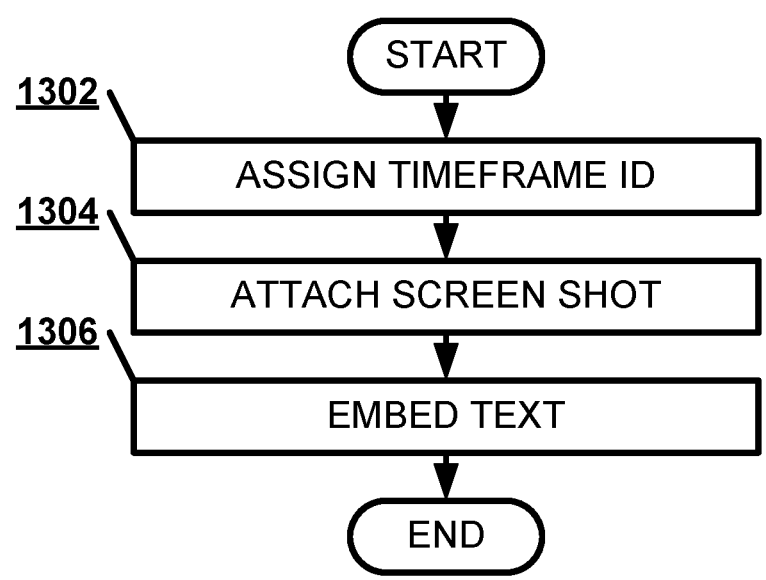
FIG. 13 illustrates, in a flowchart, one example of a method of associating a presentation context with a communication with an audience member.

FIG. 13 illustrates, in a flowchart, one example of a method 1300 of associating a presentation context with a communication with an audience member device. The audience member device may assign a presentation timeframe identifier to the communication represented by a timestamp relative to the start time of the presentation or a slide identifier for a slide show presentation (Block 1302). The audience member device may attach a screenshot for the presentation to the communication (Block 1304). The audience member device may embed a presentation data item from the presentation into the communication (Block 1306).

Figure 14:
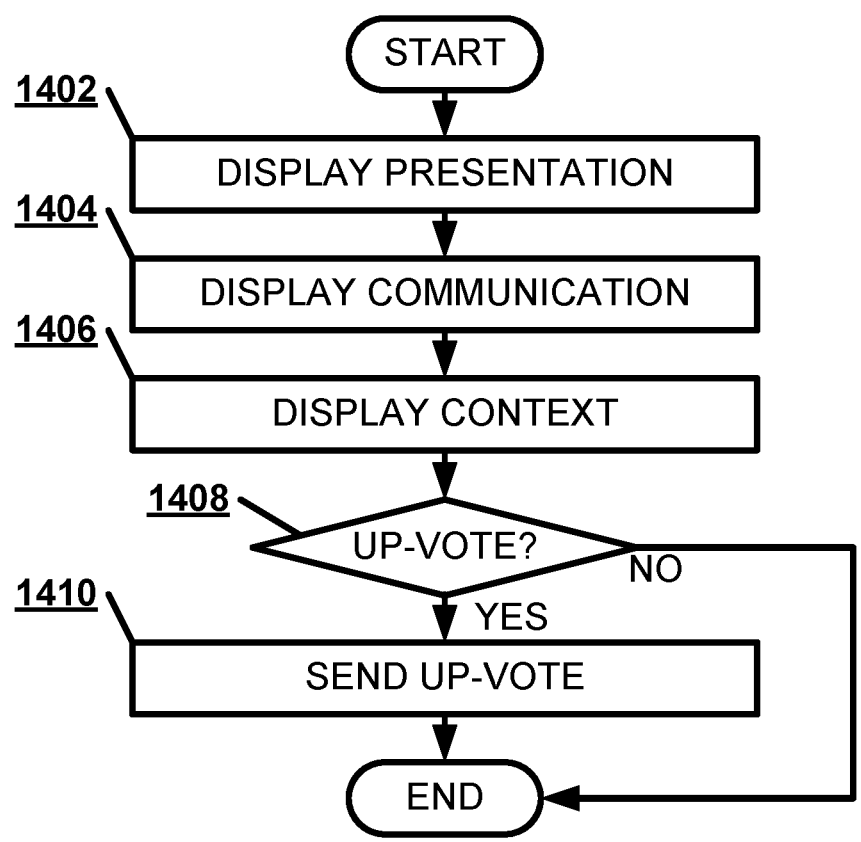
FIG. 14 illustrates, in a flowchart, one example of a method of presenting a communication to an audience member.

FIG. 14 illustrates, in a flowchart, one example of a method 1400 of presenting a communication to an audience member device. The audience member device may display a presentation to an audience member received from a presentation control device (Block 1402). The audience member device may display in a communication scroll an associate communication from an associate audience member of the presentation audience (Block 1404). The audience member device may display a presentation context for the associate communication (Block 1406). If the audience member device receives from the audience member an up-vote for the associate communication from the associate audience member (Block 1408), the audience member device may send the up-vote for the associate communication from the associate audience member to the presentation control device (Block 1410).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A presentation control device, comprising:
    an output device configured to display a presentation controlled by a presenter to a presentation audience as part of a group presentation session;
    an input device configured to receive from the presenter a communication rule controlling an interaction between an audience member device and the presentation control device as part of controlling the presentation;
    a communication interface configured to receive, during display of the presentation, a communication regarding the presentation from an audience member in the presentation audience via the audience member device, wherein the communication specifies a presentation context to which the communication relates;
    a presenter user interface configured to display, during the presentation and as a separate user interface to the presenter, a member identifier associated with the audience member and a selectable anonymity field associated with the member identifier to facilitate anonymizing the communication from the audience member when displaying the communication via the output device; and
    a processing core having at least one processor configured to direct the communication based on the communication rule.

2. The presentation control device of claim 1, wherein the communication interface is further configured to provide to the presenter control of access to an external network by the audience member device.

3. The presentation control device of claim 1, further comprising:
    memory configured to maintain a communication queue for communications from the presentation audience when the group presentation session is in a "Do Not Disturb" mode.

4. The presentation control device of claim 1, wherein the processing core is further configured to block a disruptive audience member device of a disruptive audience member from sending communications upon direction of the presenter.

5. The presentation control device of claim 1, further comprising:
    memory configured to record the group presentation session for a later review.

6. The presentation control device of claim 1, wherein the communication interface is further configured to return an automated response to the audience member device.

7. The presentation control device of claim 1, wherein the communication interface is further configured to broadcast the communication to the presentation audience.

8. The presentation control device of claim 1, wherein the communication interface is further configured to receive from an associate audience member device an up-vote for a query from the audience member.

9. The presentation control device of claim 1, wherein the processing core is further configured to insert the communication into the presentation.

10. The presentation control device of claim 1, further comprising:
    memory configured to record a communication session with the audience member device for a later review and organized based on the audience member.

11. The presentation control device of claim 1, wherein the processing core is further configured to determine an anonymization for the communication based on the communication rule.

12. The presentation control device of claim 1, wherein the processing core is further configured to anonymize the communication prior to presentation to the presenter.

13. A computing device, having a memory to store a series of instructions that are executed by at least one processor to implement a group presentation application, the computing device configured to
    access a group presentation session in an interactive presentation environment with an audience member device;
    display a presentation controlled by a presentation control device on the audience member device to an audience member of a presentation audience; and
    send from the audience member device, and during display of the presentation on the presentation control device, a communication regarding the presentation to the presentation control device subject to a communication rule entered by a presenter controlling an interaction between the audience member device and the presentation control device, wherein the communication specifies a presentation context to which the communication relates, and wherein the communication rule facilitates anonymizing, based on a selectable anonymity field associated with an identifier of the audience member device, the communication from the audience member device when displaying the communication via the presentation control device.

14. The computing device of claim 13, wherein the computing device is further configured to
    receive in the presentation control device a network rule controlling access to an external network by the audience member device.

15. The computing device of claim 13, wherein the computing device is further configured to
    associate the presentation context with the communication.

16. The computing device of claim 13, wherein the computing device is further configured to
    assign a presentation timeframe identifier to the communication.

17. The computing device of claim 13, wherein the computing device is further configured to
    attach a screenshot for the presentation to the communication.

18. The computing device of claim 13, wherein the computing device is further configured to
    embed a presentation data item from the presentation into the communication.

19. A machine-implemented method, comprising:
    establishing a group presentation session in an interactive presentation environment;
    controlling a presentation displayed on a presentation screen to a presentation audience with a presentation control device;

receiving from a presenter in the presentation control device a communication rule controlling an interaction between an audience member device and the presentation control device as part of controlling the presentation, wherein the communication rule is based on a selectable anonymity field associated with an identifier of the audience member device;

receiving, during display of the presentation on the presentation screen, a communication regarding the presentation from an audience member in the presentation audience via the audience member device, wherein the communication specifies a presentation context to which the communication relates;

applying the communication rule to the communication with the audience member device to facilitate anonymizing the communication from the audience member device when displaying the communication via the output device as part of controlling the presentation; and directing the communication based on the communication rule.

20. The method of claim 19, further comprising:

applying an anonymization for the communication on a member-by-member basis.

21. The presentation control device of claim 1, wherein the presentation context indicates at least one of a timestamp, screenshot, slide identifier, or other embedded presentation item to which the communication relates.

* * * * *